United States Patent
Lee et al.

(10) Patent No.: US 8,507,112 B2
(45) Date of Patent: Aug. 13, 2013

(54) DATA RECORDING MEDIUM FOR DATA STORAGE AND METHOD OF RECORDING OR ERASING DATA USING THE SAME

(75) Inventors: Jung-hyun Lee, Yongin-si (KR); Sang-jun Choi, Yongin-si (KR); Hyung-jin Bae, Seoul (KR); Young-ju Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1148 days.

(21) Appl. No.: 11/984,594

(22) Filed: Nov. 20, 2007

(65) Prior Publication Data

US 2008/0199719 A1 Aug. 21, 2008

(30) Foreign Application Priority Data

Feb. 16, 2007 (KR) .......................... 10-2007-0016780

(51) Int. Cl.
*G11B 5/02* (2006.01)
*B32B 7/02* (2006.01)
*B32B 15/04* (2006.01)

(52) U.S. Cl.
USPC ........................................ 428/800; 369/126

(58) Field of Classification Search
None
See application file for complete search history.

(56) References Cited

U.S. PATENT DOCUMENTS

| 5,985,404 | A | 11/1999 | Yano et al. | |
| 6,487,106 | B1 * | 11/2002 | Kozicki | 365/153 |
| 7,903,532 | B2 * | 3/2011 | Chu et al. | 369/126 |

FOREIGN PATENT DOCUMENTS

| JP | 2004-199858 | 7/2004 |
| JP | 2005-203083 | 7/2005 |
| JP | 2005-276409 | 10/2005 |
| KR | 10-2004-0004832 | 1/2004 |

OTHER PUBLICATIONS

Korean Office Action dated Mar. 28, 2013, issued in Korean Application No. 10-2007-0016780, and English translation thereof.

* cited by examiner

*Primary Examiner* — Kevin Bernatz
(74) *Attorney, Agent, or Firm* — Harness, Dickey & Pierce, P.L.C.

(57) ABSTRACT

Provided is a data recording medium having improved data recording/storage characteristics and with an improved structure to have a higher data storage capacity, and a method of recording and/or easing data using the same. The data recording medium may include a Cu electrode layer on a substrate, and a data recording layer formed of a compound including a metal and at least one non-metal selected from the group consisting of S, Se, and Te, on the Cu electrode layer. Data is recordable to or erasable from the data recording layer by changing the resistance of the data recording layer by diffusing Cu ions from the Cu electrode layer to the data recording layer or by erasing Cu ions from the data recording layer by diffusing Cu ions from the data recording layer back to the Cu electrode layer, according to a voltage pulse applied to the data recording layer.

7 Claims, 4 Drawing Sheets

TOPOGRAPHY   CURRENT IMAGE (0.1V)

TOPOGRAPHY   CURRENT IMAGE (0.1V)

DATA RECORDING MEDIUM FOR DATA STORAGE AND METHOD OF RECORDING OR ERASING DATA USING THE SAME

This U.S. non-provisional patent application claims the benefit of priority under 35 U.S.C. §119 to Korean Patent Application No. 10-2007-0016780, filed on Feb. 16, 2007 in the Korean Intellectual Property Office, the disclosure of which is incorporated herein in its entirety by reference.

BACKGROUND

Due to the rapid development of data storage devices such as conventional hard disks and optical disks, information storage devices having recording densities of 1 Gbit/inch$^2$ or greater have been developed. Accordingly, higher capacity information storage devices are required. However, conventional information storage devices may have limited recording density due to super-paramagnetic limits and/or laser diffraction limits of optical disks. Recently, research has been conducted to develop an information storage device having a recording density of 100 Gbit/inch$^2$ or greater in an effort to overcome the diffraction limit of light using near-field optics technology.

Higher capacity information storage devices using tip-shaped probes that can be observed by atomic force microscopy (AFM) are also being researched. The tip-shaped probes of such devices may be reduced to several nanometers in size, and may be used to observe surface minute structures on an atomic level. Theoretically, terabyte information storage devices may be manufactured using such tip shaped probes. One important factor in an information storage device using tip-shaped probes may be the type of recording medium and the recording method. An example of a recording medium may be a ferroelectric recording medium.

FIG. 1 is a cross-sectional view of a conventional ferroelectric recording medium. Referring to FIG. 1, a conventional ferroelectric recording medium may include a bottom electrode 4 and a recording medium layer 8 sequentially stacked on a substrate 2. The recording medium layer 8 may be a ferroelectric thin layer formed of $PbTiO_3$, $PbZr_xTi_{(1-x)}O_3$ (PZT), or $SrBi_2Ta_2O_9$(SBT). When a voltage pulse is applied between the bottom electrode 4 and an AFM tip 9 is disposed above the recording medium layer 8, the polarization of the recording medium layer 8 may be locally changed. Depending on the polarity of the voltage, data corresponding to upward or downward polarization may be recorded, and the polarization may be detected using resistive probes, for example.

When a ferroelectric thin layer is used as a recording medium, the recording speed of data may be higher, the power consumption may be very low, and repeated recording may be possible. However, a ferroelectric recording medium may have poor data maintenance characteristics and/or poor surface roughness characteristics. For example, when the surface roughness characteristics are poor, more time is needed to control the distance between the AFM tip and the recording medium, thereby slowing the reading/recording speed and/or possibly tearing the tip.

Due to one or more of the above problems, a ferroelectric thin layer having good crystalline characteristics, good surface roughness characteristics and higher recording density data storage capacity, as well as a method of manufacturing the ferroelectric thin layer are needed. Due to the properties of ferroelectric materials and the limitations of known manufacturing processes of ferroelectric materials, conventional methods of manufacturing ferroelectric thin layers do not overcome these problems.

Recently, in an effort to realize new higher capacity storage or recording media, various methods have been studied, such as depositing a ferromagnetic material in a predetermined region and probing it, or reading data thermomechanically using melting of polymers. However, in the case of ferromagnetic storage or recording media, when the storage space is reduced, the ferromagnetic material may be converted to a paramagnetic material, and thus there are limitations in the storage capacity. Also, when reading data thermomechanically using the melting of polymers, there are also limitations in the storage capacity when heat is transferred to the polymers not only in a vertical direction but also in a horizontal direction.

SUMMARY

Example embodiments relate to a data recording medium having improved recording/storing characteristics with an improved structure having a higher data storage capacity, as well as a method of recording and erasing data using the recording medium.

According to an example embodiment, there may be provided a data recording medium, including a Cu electrode layer formed on a substrate and a data recording layer formed of a compound that may include a metal and at least one element selected from the group consisting of S, Se, and Te. The compound may be formed on the Cu electrode layer. Data may be recorded to or erased from the data recording layer by changing the resistance of the data recording layer by diffusing Cu ions from the Cu electrode layer to the data recording layer, or by erasing Cu ions from the data recording layer by diffusing Cu ions from the data recording layer back to the Cu electrode layer, according to a voltage pulse applied to the data recording layer.

According to an example embodiment, a method of recording and/or erasing data, may include providing a data recording medium having an electrode layer comprised of one of a Cu layer, an Ag layer and a Zn layer and a data recording layer formed of a compound that includes a metal and one element selected from the group consisting of S, Se, and Te the compound being formed on the electrode layer, and recording and/or erasing data to or from the data recording layer by changing the resistance of the data recording layer by diffusing Cu, Ag or Zn ions from the electrode layer to the data recording layer or by erasing Cu, Ag or Zn ions from the data recording layer by diffusing Cu, Ag or Zn ions from the data recording layer back to the electrode layer, according to a voltage pulse applied to the data recording layer.

The data recording layer may be formed of one selected from the group consisting of $GeTe_x$ ($0<x\leq1$), $CuS_x$ ($0<x\leq1$), $GeS_x$ ($0<x\leq1$), and $SbTe_x$ ($0<x\leq1$).

According to example embodiments, a data recording medium having an improved recording/storing characteristic with an improved structure to have higher capacity data storage and a method of recording and/or erasing data using the recording medium may be provided.

BRIEF DESCRIPTION OF THE DRAWINGS

The above and other features and advantages of example embodiments will become more apparent by with reference to the attached drawings in which.

DETAILED DESCRIPTION OF EXAMPLE EMBODIMENTS

Figure 1:
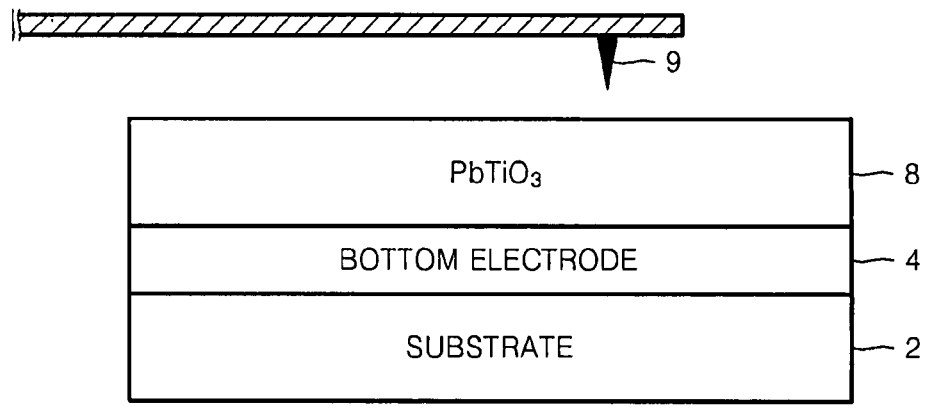
FIG. 1 is a cross-sectional view of a conventional ferroelectric recording medium.

Example embodiments will now be described more fully with reference to the accompanying drawings. The thicknesses of layers or regions illustrated in the drawings are exaggerated for clarity of the present specification.

Detailed illustrative embodiments of the example embodiments are disclosed herein. However, specific structural and functional details disclosed herein are merely representative for purposes of describing example embodiments. The example embodiments may, however, may be embodied in many alternate forms and should not be construed as limited to only embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
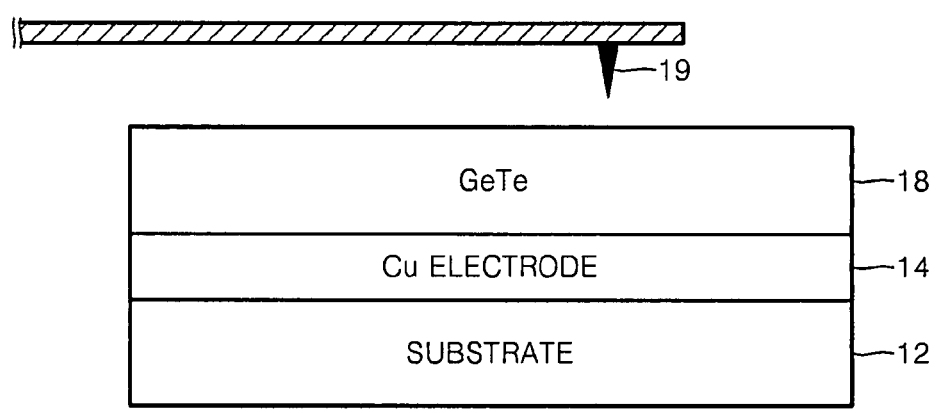
FIG. 2 is a cross-sectional view of a data recording medium according to an example embodiment.

FIG. 2 is a cross-sectional view of a data recording medium according to an example embodiment.

In FIG. 2, the data recording medium may include a substrate 12, a Cu electrode layer 14, and/or a data recording layer 18 sequentially stacked on the substrate 12. The data recording layer 18 may be formed of a compound that includes a metal and at least one element selected from the group consisting of S, Se, and Te. The data recording layer 18 may be formed of $GeTe_x$ ($0<x\leq1$), $CuS_x$ ($0<x\leq1$), $GeS_x$ ($0<x\leq1$), or $SbTe_x$ ($0<x\leq1$). The Cu electrode layer 14 and the data recording layer 18 may be each formed using a vapor deposition method such as sputtering, metalorganic chemical vapor deposition (MOCVD), plasma enhanced metalorganic chemical vapor deposition (plasma MOCVD), or atomic layer deposition (ALD), for example. A system may include the data recording medium and a probe, for example, an atomic force microscopy (AFM) tip 19.

A method of recording and/or erasing data in the data recording medium according to example embodiments will be described hereinafter.

When a voltage pulse is applied between the Cu electrode layer 14 and the atomic force microscopy (AFM) tip 19 disposed near (for example, above) the data recording layer 18, the resistance of the data recording layer 18 may change locally. For example, according to the polarity of the voltage pulse, the resistance of the data recording layer 18 may change to a resistance state "$R_1$" or "$R_2$ ($R_2>R_1$)", and each resistance state may be detected using a resistive probe.

For example, when a negative voltage pulse is applied to the data recording layer 18 using the AFM tip 19, Cu ions ($Cu^{2+}$) may be diffused from the Cu electrode layer 14 to the data recording layer 18, and the resistance of the data recording layer 18 may be changed to "$R_1$". The Cu ions diffused from the Cu electrode layer 14 may be diffused to a grain boundary, or other defect region of the data recording layer 18, and segregated in the grain boundary or defect region and thus stabilized. Accordingly, the conductivity of the data recording layer 18 may be improved by the stabilization of the Cu ions, and the resistance of the data recording layer 18 may be lowered to "$R_1$". The negative voltage applied to the data recording layer 18 may be controlled to be −2 V to −0.3 V, and diffusion of an appropriate amount of Cu ions ($Cu^{2+}$) may be induced in this range. For example, when the negative voltage is greater than −0.3 V, very few Cu ions are diffused to the data recording layer 18, and thus it may be difficult to detect the resistance state of the data recording layer 18. When the negative voltage is less than −2 V, too many Cu ions are diffused to the data recording layer 18, and thus it may be difficult to perform a refresh operation, which erases data that is input previously.

When a positive voltage pulse is applied to the data recording layer 18 using the AFM tip 19 when the resistance of the data recording layer 18 is "$R_1$", the Cu ions distributed in the grain boundary or the defect region of the data recording layer 18 may be diffused back to the Cu electrode layer 14, and thus may be erased from the data recording layer 18. As a result, the resistance of the data recording layer 18 may be changed to "$R_2$" ($R_2>R_1$). The positive voltage may be controlled to be 0.3 V to 2 V, e.g., a range that corresponds to the range of the negative voltage for setting the resistance of the data recording layer 18 to "$R_1$".

Thus, according to example embodiments, data may be recorded to and/or erased from the data recording layer 18 by changing the resistance of the data recording layer 18 to "$R_1$" or "$R_2$" ($R_2 > R_1$) and reading the resistance state using a resistive probe.

In example embodiments, the thicknesses of the data recording layer 18 and the Cu electrode layer 14 may be about 100 Å to about 10,000 Å, respectively. When the thickness of the Cu electrode layer 14 is 100 Å or less, the Cu electrode layer 14 may not function properly as an electrode. Particularly, Cu ions may not be properly supplied from the Cu electrode layer 14 and thus increase the operating voltage of the data recording medium. On the other hand, when the thickness of the Cu electrode layer 14 is 10,000 Å or greater, the operating voltage of the recording medium may be increased. Also, when the thickness of the data recording layer 18 is 100 Å or less, the data recording layer 18 may be easily damaged when there is friction between the data recording layer 18 and the AFM tip 19, and the lifetime of the data recording layer 18 may be reduced during repeated recording/erasing operations. In addition, because the resistance of the data recording layer 18 may be easily changed by a very small amount of Cu ions, it may become very difficult to control the resistance of the data recording layer 18. On the other hand, when the thickness of the data recording layer 18 is 10,000 Å or greater, only a considerably large amount of Cu ions can change the resistance of the data recording layer 18, and this may increase the operating voltage of the data recording medium. In example embodiments, the electrode layer may be comprised of Ag or Zn.

In the data recording medium according to example embodiments, data may be recorded and/or erased by changing the resistance of the data recording layer 18 by segregating or volatilizing Cu ions in the grain boundary of the data recording layer 18. Thus, data may be recorded and/or erased even in a small region having a diameter of 10 nm or smaller. Accordingly, a greater amount of data can be stored in the data recording medium of example embodiments than in a conventional data recording medium. Consequently, a higher capacity and/or higher recording density information storage device may be realized.

Figure 3A:
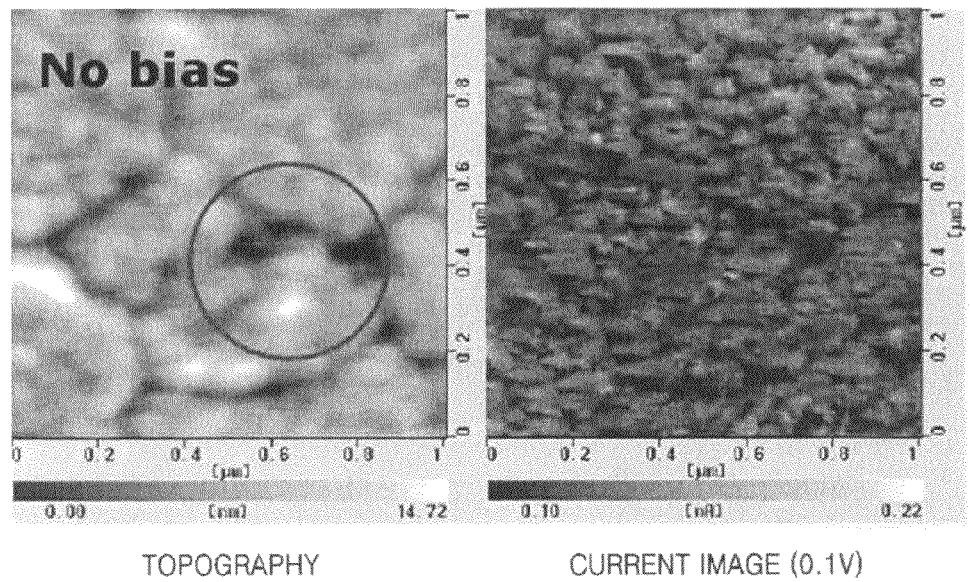
FIG. 3A is a photographic image showing a grain boundary of a data recording layer before applying a voltage pulse to a data recording medium according to an example embodiment.
Figure 3B:
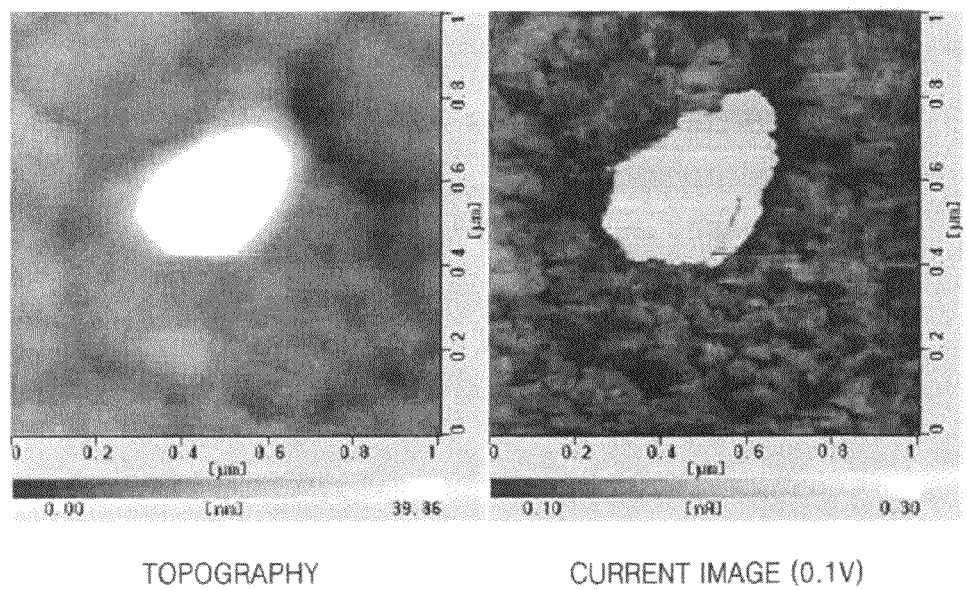
FIG. 3B is a photographic image showing Cu ions that are diffused to a grain boundary of the data recording layer, and segregated and precipitated after a voltage pulse is applied to the data recording medium.
Figure 4:
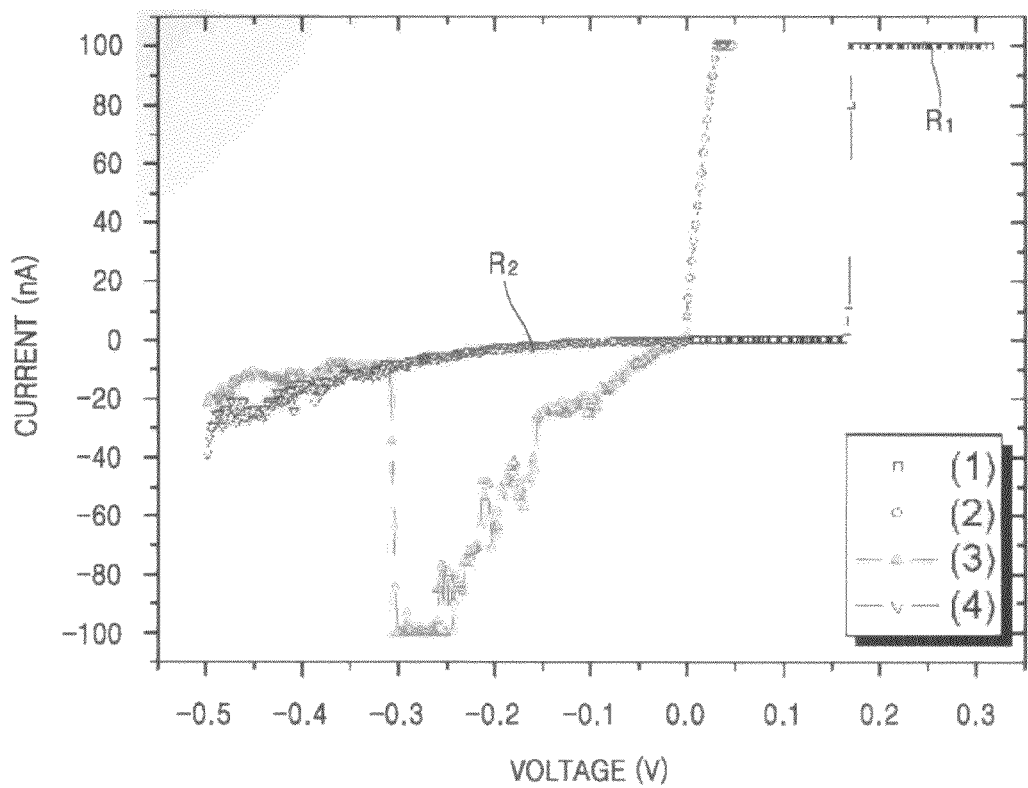
FIG. 4 is a graph showing resistance of the data recording layer in FIGS. 3A and 3B, respectively.

FIG. 3A is a photographic image showing the grain boundary of a data recording layer before applying a voltage pulse to a data recording medium according to an example embodiment. FIG. 3B is a photographic image showing Cu ions which are diffused to the grain boundary of the data recording layer and segregated and precipitated after applying a voltage pulse to the data recording medium. FIG. 4 is an example graph showing the resistance of the data recording layer of FIGS. 3A and 3B, respectively.

Referring to the graph of FIG. 4, "$R_1$" shows the resistance of the data recording layer of FIG. 3A, and "$R_2$ ($R_2 > R_1$)" shows the resistance of the data recording layer of FIG. 3B. In FIG. 4, a negative voltage was applied to an AFM tip and data was stored, and the voltage-current characteristic of the data recording layer was measured (plot (1)). A positive voltage was applied to the data recording layer to erase the stored data, and a negative voltage was applied again to store data. This operation was repeated two, three, and four times, and the voltage-current characteristic of the data recording layer was measured, respectively (plots (2), (3), and (4)). FIG. 3B shows the grain boundary of the data recording layer when performing the operation four times. Referring to FIG. 3B, it may be observed that Cu protrudes across the grain boundary of a GeTe data recording layer.

Figure 5:
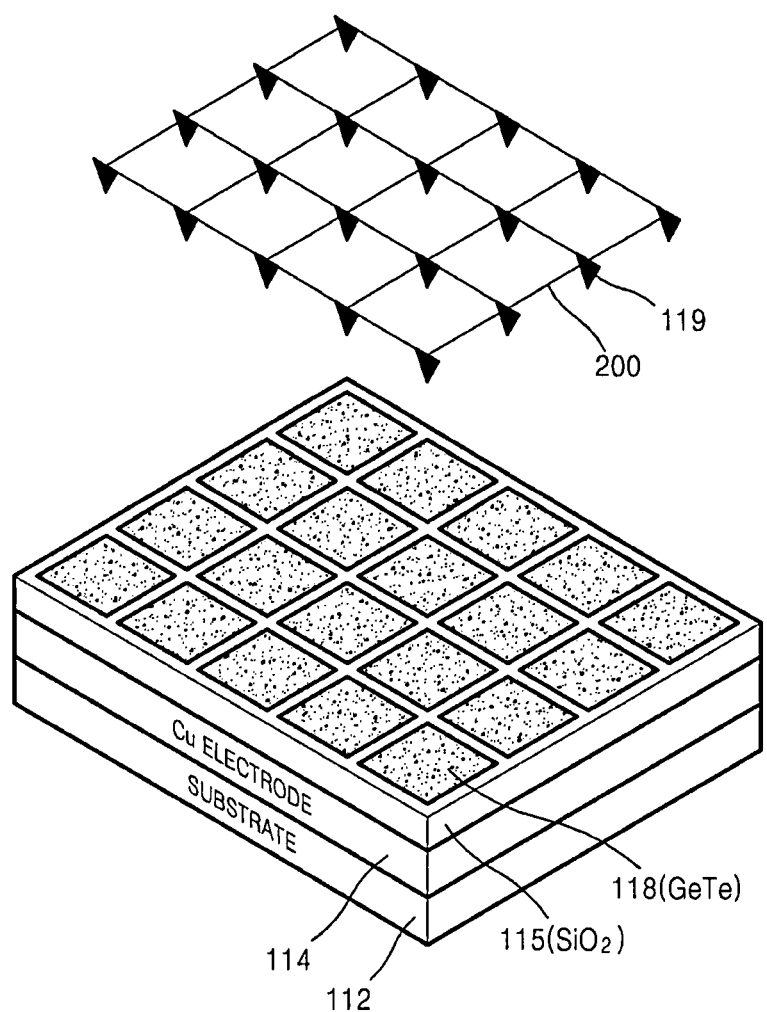
FIG. 5 is a cross-sectional view of a data recording medium according to an example embodiment.

FIG. 5 is a cross-sectional view of a data recording medium according to an example embodiment. Descriptions of elements common to the data recording medium illustrated in FIG. 2 are not repeated.

Referring to FIG. 5, the data recording medium according to example embodiments may include a Cu electrode layer 114 and a data recording layer 118 sequentially stacked on a substrate 112. The data recording layer 118 may be partitioned into a plurality of unit cells, for example, by a $SiO_2$ barrier rib structure 115. As illustrated in FIG. 5, different data values may be stored in the unit cells using a multi-probe apparatus 200 having an array of a plurality of AFM tips 119. Thus, a higher capacity information storage device that may be operated at higher speeds may be realized in a shorter time. Similar to the data recording medium illustrated in FIG. 2, the data recording layer 118 may include a compound having a metal and at least one element selected from the group consisting of S, Se, and Te. The data recording layer may be formed of $GeTe_x$ ($0 < x \leq 1$), $CuS_x$ ($0 < x \leq 1$), $GeS_x$ ($0 < x \leq 1$), and $SbTe_x$ ($0 < x \leq 1$).

According to an example embodiment, a data recording medium having a suitable recording/storing characteristic with an improved structure to have a higher data storage capacity, and a method of recording and/or erasing data using the data recording medium may be provided. In the data recording medium and the method of recording and/or erasing data using the data recording medium according to example embodiments, data may be recorded and/or erased by changing the resistance of a data recording layer of the data recording medium by segregating or volatilizing Cu ions in the grain boundary of the data recording layer. Thus, data may be recorded and/or erased effectively even in a smaller region having a diameter of 10 nm or smaller. Accordingly, a greater amount of data may be stored in the data recording medium than in a conventional data recording medium. Consequently, a higher capacity and/or higher recording density information storage device may be realized.

While example embodiments have been particularly shown and described with reference to figures, it will be understood by those or ordinary skill in the art that various changes in form and details may be made therein without departing from the spirit and scope of the example embodiments as defined by the appended claims. Thus, to the maximum extent allowed by law, the scope of example embodiments is to be determined by the broadest permissible interpretation of the following claims and their equivalents, and shall not be restricted or limited by the foregoing detailed description.

What is claimed is:

1. A data recording medium, comprising:
   a Cu electrode layer on a substrate; and
   a data recording layer formed of a compound including a metal and at least one non-metal selected from the group consisting of S, Se, and Te, prior to application of the voltage, a first surface of the data recording layer being on the Cu electrode layer and a surface of the data recording layer opposite the first surface is at least partially exposed,
   wherein the data recording layer has a changeable resistance and Cu ions are diffusible from the Cu electrode layer to the data recording layer and from the data recording layer to the Cu electrode layer upon application of the voltage.

2. The data recording medium of claim 1, wherein the data recording layer includes a compound selected from the group consisting of $GeTe_x$ ($0<x\leqq1$), $CuS_x$ ($0<x\leqq1$), $GeS_x$ ($0<x\leqq1$), and $SbTe_x$ ($0<x\leqq1$).

3. The data recording medium of claim 1, wherein the thickness of the data recording layer is 100 Å to 10,000 Å.

4. The data recording medium of claim 1, wherein the thickness of the Cu electrode layer is 100 Å to 10,000 Å.

5. The data recording medium of claim 1, further comprising a barrier rib structure on the data recording layer.

6. A system, comprising:
   the data recording medium of claim 1; and
   a probe for applying a voltage pulse to the data recording layer.

7. The data recording medium of claim 1, wherein the data recording layer is partitioned into a plurality of cell units.

* * * * *